US012382876B2

(12) United States Patent
LoPresti

(10) Patent No.: US 12,382,876 B2
(45) Date of Patent: Aug. 12, 2025

(54) TREE ROOTING ENCLOSURE APPARATUS

(71) Applicant: Charles LoPresti, Merritt Island, FL (US)

(72) Inventor: Charles LoPresti, Merritt Island, FL (US)

( * ) Notice: Subject to any disclaimer, the term of this patent is extended or adjusted under 35 U.S.C. 154(b) by 0 days.

(21) Appl. No.: 18/430,856

(22) Filed: Feb. 2, 2024

(65) Prior Publication Data
US 2024/0164258 A1    May 23, 2024

Related U.S. Application Data

(63) Continuation-in-part of application No. 18/094,557, filed on Jan. 9, 2023, now Pat. No. 12,004,455.

(60) Provisional application No. 63/417,750, filed on Oct. 20, 2022.

(51) Int. Cl.
A01G 2/20    (2018.01)
A01G 13/10   (2006.01)

(52) U.S. Cl.
CPC .............. A01G 2/20 (2018.02); A01G 13/10 (2013.01)

(58) Field of Classification Search
CPC ..... H01R 13/51; H01R 13/5208; H01R 13/52
USPC ........................................................ 47/24.1
See application file for complete search history.

(56) References Cited

U.S. PATENT DOCUMENTS

| 1,838,702 | A | * | 12/1931 | Partridge | A01G 13/27 426/106 |
| 2,096,507 | A | * | 10/1937 | Czeszcziczki, Jr. | A01G 5/04 428/17 |
| 2,939,248 | A | * | 6/1960 | Beck | A01G 9/02 47/20.1 |
| 3,052,062 | A | * | 9/1962 | Geisthoff | F16D 3/841 47/6 |
| 3,466,799 | A | * | 9/1969 | McComb | A01G 13/27 47/2 |
| 4,187,639 | A | * | 2/1980 | Ono | A01G 7/00 428/17 |
| 4,827,666 | A | * | 5/1989 | Tweddell, III | A01G 7/00 249/55 |
| 8,171,669 | B1 | * | 5/2012 | Park | A01G 2/20 47/32 |
| 8,752,331 | B1 | * | 6/2014 | Park | A01G 2/20 47/79 |
| 10,750,670 | B2 | * | 8/2020 | Logan | A01G 9/029 |
| 2007/0186464 | A1 | * | 8/2007 | Cho | A01G 13/27 47/24.1 |

(Continued)

FOREIGN PATENT DOCUMENTS

CN    111108931 A  *  5/2020
FR    1319409   A  *  3/1963

(Continued)

Primary Examiner — Morgan T Jordan
(74) Attorney, Agent, or Firm — Bullock Law; Stephen Bullock

(57) ABSTRACT

A tree rooting enclosure apparatus including a body housing with a cylindrical body base culminating into a pair of opposing end openings. The body and end openings are structured to accommodate a portion of a plant therethrough. The apparatus as a whole may be made of two removably engaged elongate halves structured to surround a selected portion of a plant and attach to itself forming a water-resistant fit around the selected portion of the plant.

20 Claims, 15 Drawing Sheets

(56) References Cited

U.S. PATENT DOCUMENTS

| | | | |
|---|---|---|---|
| 2010/0205862 A1* | 8/2010 | Cagata | A01G 9/029 |
| | | | 47/1.01 R |
| 2017/0112076 A1* | 4/2017 | Kotter, Sr. | A01G 9/029 |
| 2018/0368332 A1* | 12/2018 | Logan | A01G 2/20 |
| 2019/0159408 A1* | 5/2019 | Fletcher | A01G 13/28 |
| 2020/0022314 A1* | 1/2020 | Aizaki | A01G 7/06 |
| 2020/0113139 A1* | 4/2020 | Carabelaian | A01G 17/00 |
| 2024/0130305 A1* | 4/2024 | LoPresti | A01G 2/20 |

FOREIGN PATENT DOCUMENTS

| | | | | |
|---|---|---|---|---|
| FR | 2087132 A5 | * | 12/1971 | |
| GB | 2057234 A | * | 4/1981 | |
| GB | 2108813 A | * | 5/1983 | |
| KR | 102017841 B1 | * | 9/2019 | |
| KR | 20230150665 A | * | 10/2023 | |
| NO | 801749 L | * | 12/1980 | |
| WO | WO-9505730 A1 | * | 3/1995 | |
| WO | WO-0243471 A1 | * | 6/2002 | |
| WO | WO-2019034739 A1 | * | 2/2019 | A01G 2/20 |

* cited by examiner

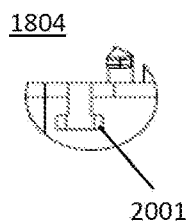 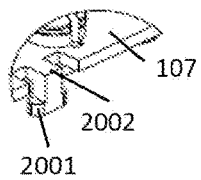 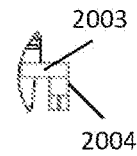 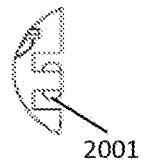
FIG. 20A   FIG. 20B   FIG. 20C   FIG. 20D
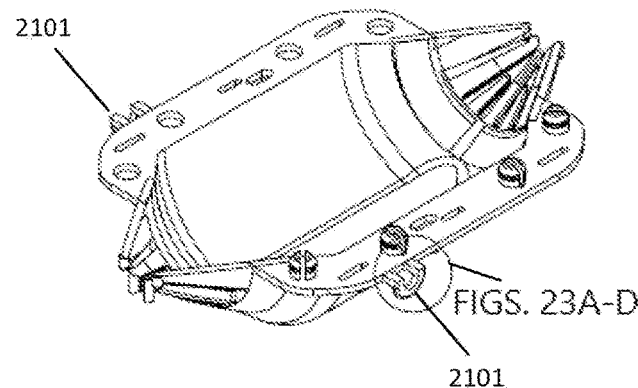
FIG. 21

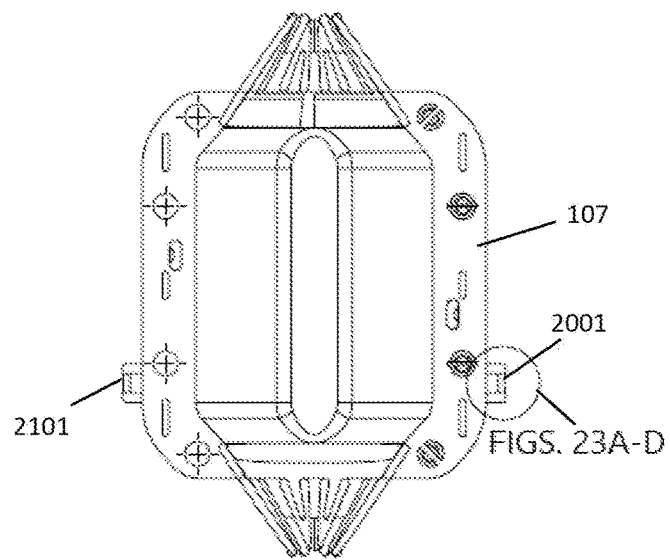
FIG. 22
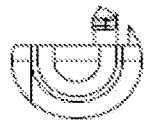 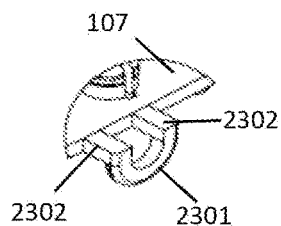 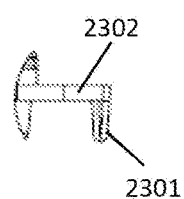 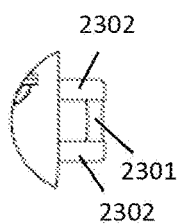
FIG. 23A  FIG. 23B  FIG. 23C  FIG. 23D

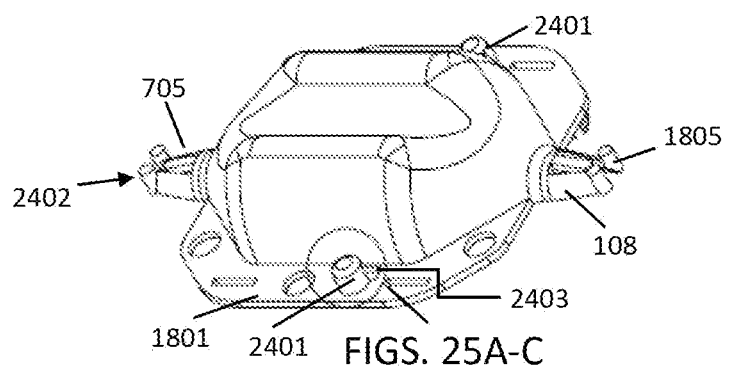
FIG. 24
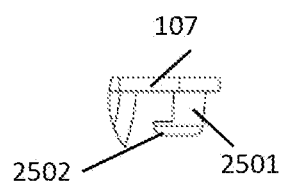 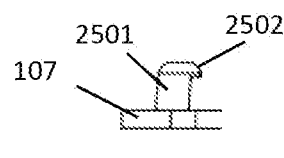 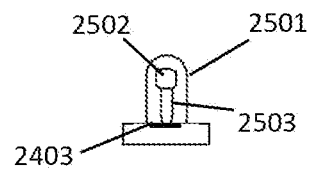
FIG. 25A  FIG. 25B  FIG. 25C

TREE ROOTING ENCLOSURE APPARATUS

FIELD OF THE INVENTION

The present invention relates to systems and methods for propagating trees. In particular, the present invention relates to growing roots from an artificially created branch aperture enclosed in a container.

BACKGROUND

New trees can be generated from the branches of existing trees by manually creating a fissure or wound on a tree branch, which removes or injures a plant's phloem layer. The injury interrupts the flow of sugars and photosynthates to the roots, which then accumulate at the injury site. This accumulation when packed within a conducive medium generates root producing hormones. Therefore, enclosing the fissure with a wrapping filled with sphagnum moss or a potting mix facilitates the stimulation of adventitious root buds rather than leaves. Once a sufficient amount of time has passed, a mature network of roots may form to allow the branch to stand alone as a separate tree. The tree branch may then be removed from its original tree at a point below the newly formed network of roots and the removed branch may be planted and nurtured as a new tree.

There exists a need for a rooting enclosure that efficiently and effectively envelops a manually created tree fissure when propagating trees. The enclosure should be optimally shaped to mimic the natural shape of the branch and should provide a number of fastening and stabilizing options for securing the enclosure that is resistant to water and animals. The enclosure should be reusable and modular in nature. Therefore, there exists a need in the art for a tree rooting enclosure apparatus and associated methods.

SUMMARY OF THE INVENTION

Embodiments of the present invention are related to a tree rooting enclosure apparatus including a body with a cylindrical body base, a pair of opposing end openings, and a plurality of spindles extending outward from the exterior edges of the pair of opposing end openings. The apparatus may be made of two removably engageable halves, each half being an identical duplicate of the other. Each half may be structured to mate with the other half when each respective half is inversely oriented with respect to the other half. Both halves when engaged may envelop at least a portion of a tree branch to propagate a rooting system.

In this embodiment, the plurality of spindles may include at least one spindle shorter in length than the remaining spindles and the spindles may be structured in at least one of a symmetrically splayed orientation and an angled orientation. The cylindrical body base diameter may be proportional to the end opening diameters by a ratio of 1 to 0.75 respectively and the cylindrical body base may include a perimeter tab extending distally therefrom. The perimeter tab may include an elbow shaped T-lever structured to facilitate opening the apparatus when both halves are engaged. Furthermore, the perimeter tab may include four rounded corners and a pair of parallel sides and the pair of opposing end openings may form a concave void in the perimeter tab at each respective end of the apparatus.

Another embodiment may include a tree rooting enclosure apparatus with a body including a cylindrical body base, a perimeter tab extending from the cylindrical body base, a pair of opposing end openings, a plurality of spindles extending outward from the exterior edges of the pair of opposing end openings, and a plurality of longitudinal channels extending the length of the cylindrical body base. The apparatus may be made of two removably engageable halves, each half being an identical duplicate of the other. Each half may be structured to mate with the other half when each respective half is inversely oriented with respect to the other half and both halves when engaged may envelop at least a portion of a tree branch to propagate a rooting system.

In this embodiment, the plurality of spindles on each half may include at least one pair of longer spindles flanking at least one shorter medial spindle. Additionally, the opposing sides of the perimeter tab may include a pair of fastening hooks structured to facilitate securing the tree rooting enclosure apparatus in a closed position with a perimeter fastening strap. Furthermore, at least one of the plurality of spindles may include an end distal to the end opening that is terminated by a cylinder. The perimeter tab of each half may include a concave protrusion structured to facilitate a user pulling apart the two halves when the two halves are engaged. The concave protrusion may be dimensioned to allow a user's finger to fit into the concave void and the perimeter tab may include a plurality of fastening apertures structured to accommodate a plurality of side cinches for securing the apparatus in a closed position.

The perimeter tab may include at least one side with a plurality of joinder pegs and an opposing side with a plurality of joinder holes. The plurality of joinder pegs of the first half enclosing member may be structured to removably engage the plurality of joinder holes of the second half enclosing member to form a water-resistant fitting when the apparatus is in a closed position. The plurality of spindles may be in an angled orientation and may include at least one spindle shorter in length than the others. At least one spindle may include an end distal to the end opening that is terminated by a cylinder.

Another embodiment may include a tree rooting enclosure apparatus with a body including a cylindrical body base body with a perimeter tab extending the entire longitudinal length of two sides of the cylindrical body base with at least one of a concave finger tab extension and an elbow shaped T-lever. It may include a pair of opposing end openings and a plurality of spindles extending outward from the exterior edges of the pair of opposing end openings. The apparatus may be made of two removably engageable halves, each half being an identical duplicate of the other and each half may be structured to mate with the other half when each respective half is inversely oriented with respect to the other half. Both halves when engaged may envelop at least a portion of a tree branch to propagate a rooting system. Furthermore, the concave finger tab protrusion and elbow shaped T-lever may be structured to facilitate a user pulling apart the two halves when the two halves are engaged.

BRIEF DESCRIPTION OF THE DRAWINGS

FIG. 20A is a front view of componentry of the tree rooting enclosure apparatus illustrated in FIG. 18.

FIG. 20B is a perspective view of componentry of the tree rooting enclosure apparatus illustrated in FIG. 18.

FIG. 20C is a side view of componentry of the tree rooting enclosure apparatus illustrated in FIG. 18.

FIG. 20D is a top view of componentry of the tree rooting enclosure apparatus illustrated in FIG. 18.

FIG. 21 is a perspective view of one half of the tree rooting enclosure apparatus according to an embodiment of the invention.

FIG. 22 is a top view of one half of the tree rooting enclosure apparatus according to the embodiment of the invention illustrated in FIG. 21.

FIG. 23A is a front view of componentry of the tree rooting enclosure apparatus illustrated in FIG. 21.

FIG. 23B is a perspective view of componentry of the tree rooting enclosure apparatus illustrated in FIG. 21.

FIG. 23C is a side view of componentry of the tree rooting enclosure apparatus illustrated in FIG. 21.

FIG. 23D is a top view of componentry of the tree rooting enclosure apparatus illustrated in FIG. 21.

FIG. 24 is a perspective view of one half of the tree rooting enclosure apparatus according to an embodiment of the invention.

FIG. 25A is a side view of componentry of the tree rooting enclosure apparatus illustrated in FIG. 24.

FIG. 25B is a side view of componentry of the tree rooting enclosure apparatus illustrated in FIG. 24.

FIG. 25C is a front view of componentry of the tree rooting enclosure apparatus illustrated in FIG. 24.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1:
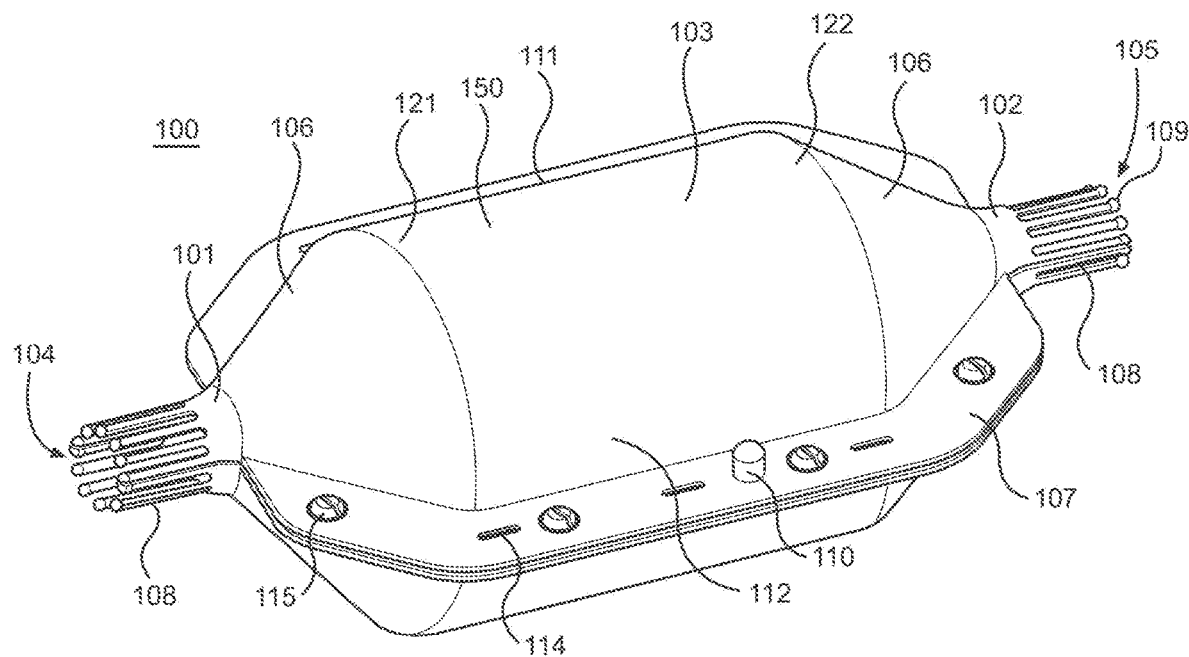
FIG. 1 is a top perspective view of a tree rooting enclosure apparatus according to an embodiment of the invention.

Referring now to FIG. 1, the tree rooting enclosure apparatus 100, hereinafter the apparatus 100, is shown. The apparatus 100 may include an apparatus first end 101, an apparatus second end 102, a body 150 with cylindrical body base 103 and a pair of body tapers 106 at a body first end 121 and a body second end 122. The apparatus 100 may also include what may be designated as an apparatus right side 111 and an apparatus left side 112.

The body tapers 106 may be a pair of opposing tapered ends culminating into a pair of opposing end openings 104, 105. As such, there may be a first end opening 104 and a second end opening 105. In some embodiments, the opposing end openings 104, 105 may include a diameter relative to the diameter of the cylindrical body base 103. By way of non-limiting example, this may be a cylindrical body base diameter to end opening diameter ratio of 2.5 to 1 respectively. Furthermore, extending distally from the edges of the end openings 104, 105 may be a plurality of spindles 108. In this particular embodiment, the spindles 108 are shown having equivalent length. Additionally, in some embodiments, the spindles 108 may include spindle ends 109 that may be bulbous.

The apparatus 100 may also include a perimeter tab 107 that may extend distally and surround the cylindrical body base 103 and body tapers 106 along a longitudinal axis of the apparatus 100. In some embodiments the perimeter tab 107 may be polygonal and structured as an octagonal lip with rounded vertices. In fact, as will be described more fully hereafter, the apparatus 100 may be constructed from two congruent enclosing members each comprising a longitudinal half of the apparatus 100 when bifurcated along its longitudinal medial axis. Therefore, as will be described, the apparatus 100 as a whole is structured from two removably engaged halves forming a water-resistant fit. It should be noted that the water-resistant fit also protects against intrusion from animals such as birds, squirrels, and the like.

The perimeter tab 107 may extend around the perimeter of each enclosing member. As such, the perimeter tab 107 may include a plurality of joinder pegs 115 extending distally from the interior right underside of the perimeter tab 107. Furthermore, the exterior of the perimeter tab 107 may also include a plurality of fastening dowels 110 protruding therefrom. In this embodiment, there are two fastening dowels 110 asymmetrically positioned in a staggered formation on the apparatus right side 111 and apparatus left side 112. Additionally, the perimeter tab 107 may include a plurality of fastening apertures 114, which in some embodiments may be slits or holes for tying the apparatus 100 together at its midsection.

Figure 2:
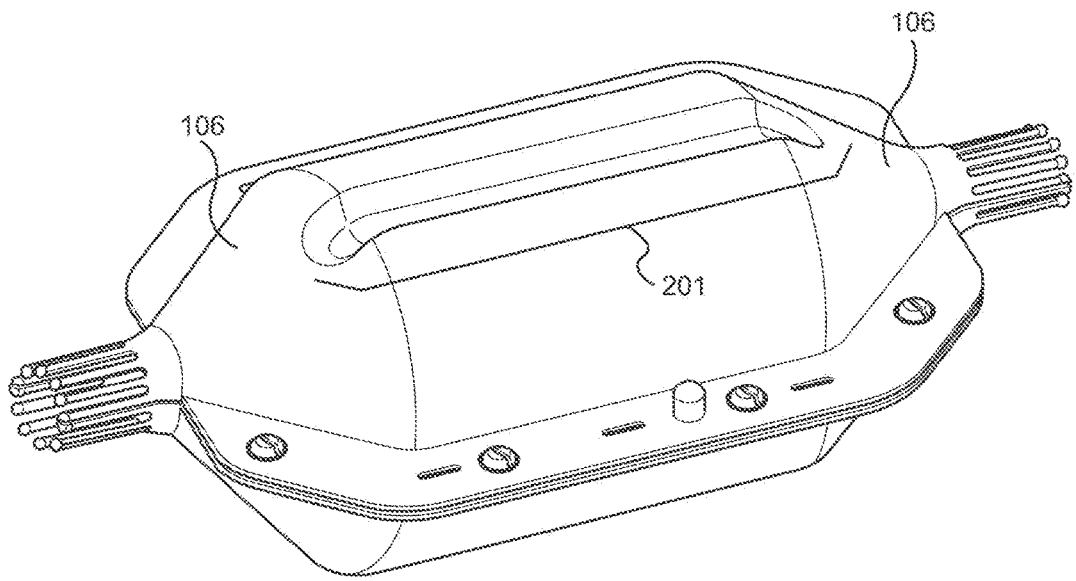
FIG. 2 is a top perspective view of the tree rooting enclosure apparatus according to another embodiment of the invention.

FIG. 2 illustrates that in some embodiments the apparatus 100 may include a plurality of longitudinal channels 201 that may extend the length of the cylindrical body base 103. A longitudinal channel 201 may be a concave indention in the exterior of the cylindrical body base 103. In this particular embodiment, there may be two longitudinal channels 201 on opposing surfaces of the apparatus 100. One skilled in the art will appreciate that there may be more or less longitudinal channels 201 within the apparatus 100 depending on need, preference, and circumstance. Likewise, in some embodiments, the longitudinal channels 201 may extend past the cylindrical body base 103 into the body taper 106 and in some embodiments may create an indented arch therein.

Figure 3:
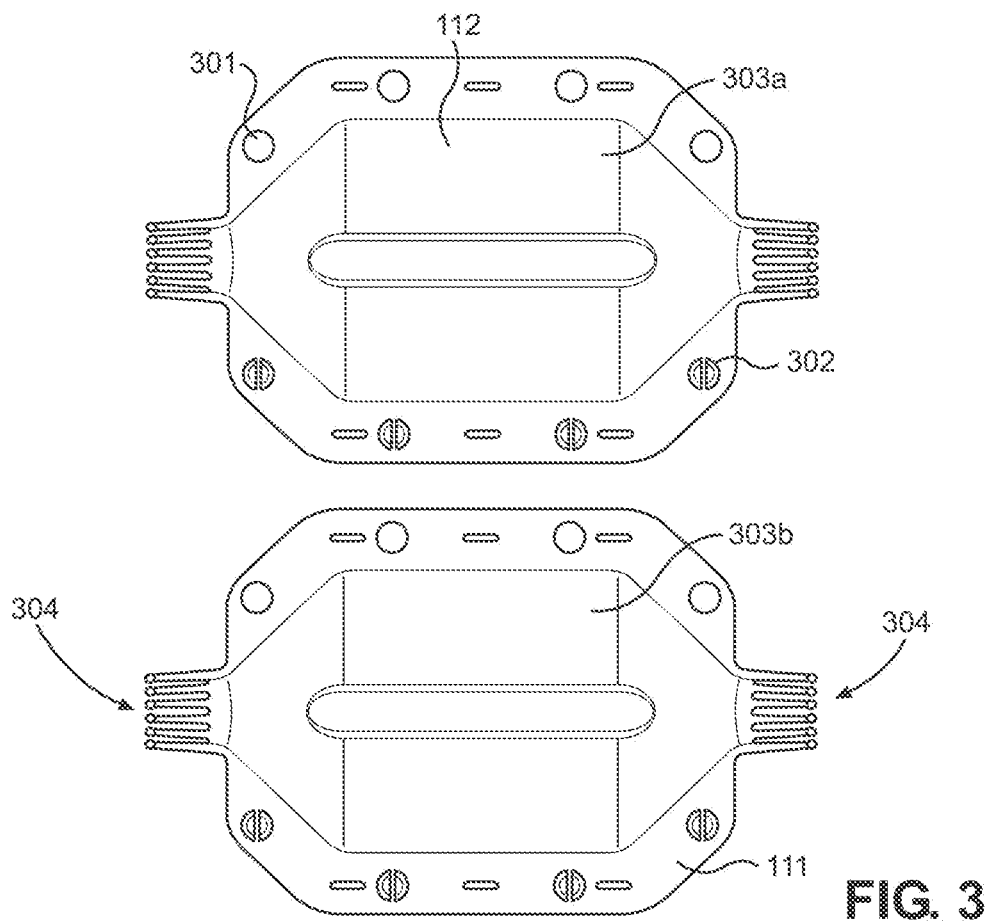
FIG. 3 is a top view of components of the tree rooting enclosure apparatus according to an embodiment of the invention.

FIG. 3 illustrates that the apparatus 100 may be made of two congruent enclosing members 303a, 303b structured to removably engage one another. Further shown are a plurality of joinder holes 301 on the apparatus left side 112 sized and positioned to accommodate the plurality of joinder pegs 115 on the apparatus right underside 111. As such, the perimeter tab 107 may include at least one side with a plurality of joinder pegs 115 and an opposing side with a plurality of joinder holes 301. In some embodiments, the plurality of joinder pegs 115 may include an exterior 302 with a facilitating groove to assist with positioning and fitting the joinder pegs 115 into and out of the joinder holes 301 with a friction fit. Furthermore, the opposing end openings 104, 105 may be formed from semi-circular medial openings 304 at opposing ends of each enclosing member 303a, 303b.

Figure 4:
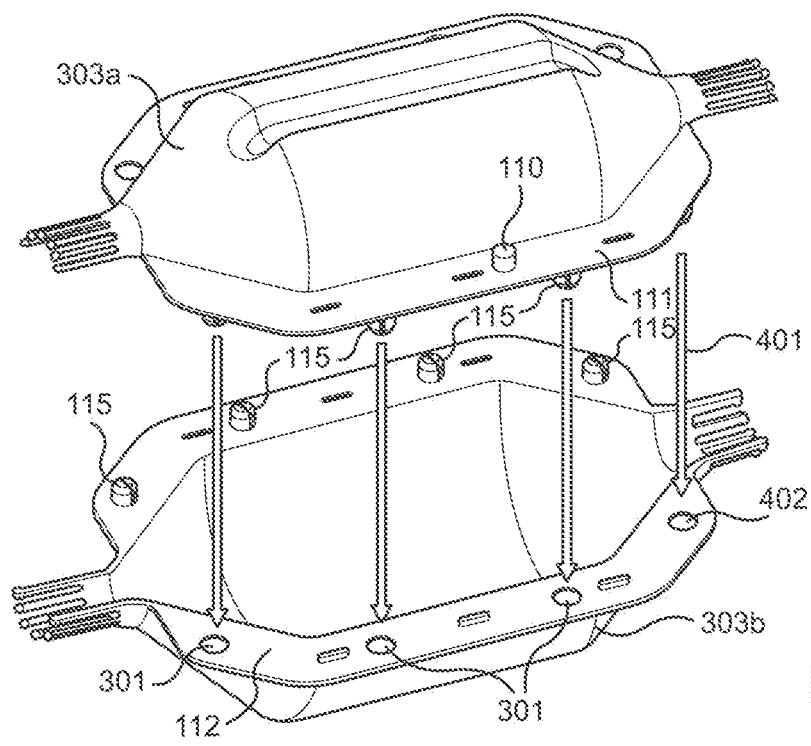
FIG. 4 is a side perspective view of components of the tree rooting enclosure apparatus being fitted together according to an embodiment of the invention.

FIG. 4 shows how the two half enclosing members 303a, 303b may be removably engaged. As shown, each enclosing member 303a, 303b is an identical duplicate of the other. A first enclosing member 303a is positioned in an inverse orientation to a second enclosing member 303b. As such, the plurality of joinder pegs 115 on the right side 111 of the first enclosing member 303a are aligned with the plurality of joinder holes 301 on the left side 112 of the second enclosing member 303b. A user may removably engage the first and second enclosing members 303a, 303b by exerting force 401 to combine the joinder pegs 115 and joinder holes 301 with a friction fit thereby placing the apparatus 100 in a closed position.

Figure 5A:
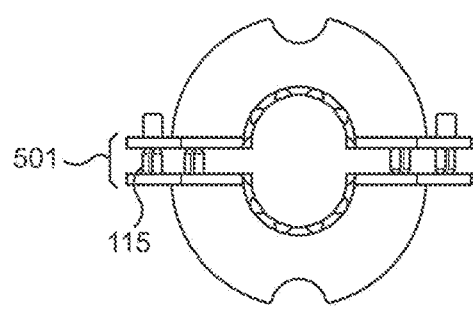
FIG. 5A is a lateral end view of the tree rooting enclosure apparatus according to an embodiment of the invention.
Figure 5B:
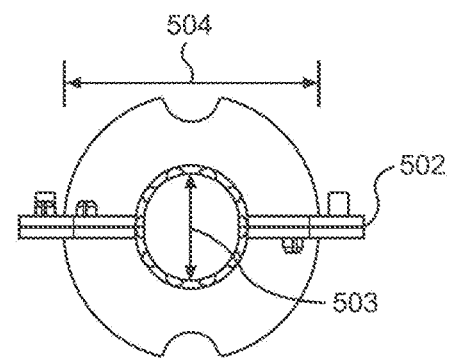
FIG. 5B is a lateral end view of the tree rooting enclosure apparatus according to an embodiment of the invention.

FIGS. 5A and 5B are lateral end views of the apparatus 100. As shown, the joinder pegs 115 are aligned with the joinder holes 301 and the enclosing member halves 303a, 303b are stacked vertically. FIG. 5B shows that when fitted together, the two enclosing member halves 303a, 303b create a water-resistant fit 502 at the perimeter tab 107 when the apparatus 100 is in a closed position. Also shown is the comparison between the cylindrical body base diameter 504 and an end opening diameter 503. As such, by way of non-limiting example, the ratio between the cylindrical body base diameter 504 at its widest point and an end opening diameter 503 may be 2.5 to 1 respectively in the closed position. However, one skilled in the art will appreciate that the ratio may be slightly larger or slightly smaller depending on need, preference, and circumstance.

Figure 6A:
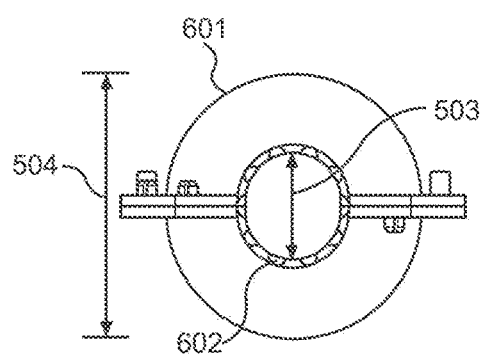
FIG. 6A is a lateral end view of the tree rooting enclosure apparatus according to an embodiment of the invention.
Figure 6B:
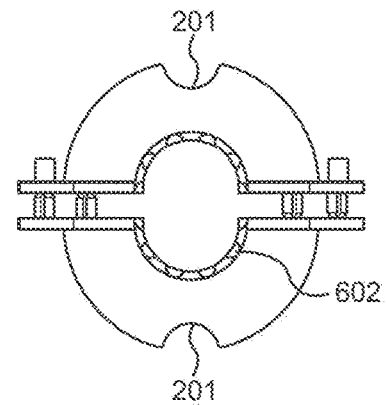
FIG. 6B is a lateral end view of the tree rooting enclosure apparatus according to an embodiment of the invention.

FIGS. 6A and 6B are lateral end views of the apparatus 100 comparing two slightly different embodiments, but with similar spindle 108 configurations. In one embodiment, as shown in FIG. 6A, the apparatus 100 may include a smooth body base 601. Meaning, this embodiment does not include the longitudinal channel 201 undulating the body base 103. However, the ratio between the cylindrical body base diameter 504 at its widest point and an end opening diameter 503 may still be 2.5 to 1 respectively. But, similar to the previous embodiment, one skilled in the art will appreciate that the ratio may be larger or smaller depending on need, preference, and circumstance. In fact, the entire apparatus 100 may be made larger or smaller to accommodate differently sized plants and branches. By way of non-limiting example, the apparatus 100 as a whole may be much smaller making the end openings 104, 105 much smaller. Likewise, the apparatus 100 may be made much larger to accommodate larger branches and plants whereby the end openings 104, 105 and cylindrical body base diameter 504 would be much larger. Likewise, one skilled in the art will appreciate that the ratio between the end opening diameter 503 and the cylindrical body base diameter 504 may be larger or smaller depending on need, preference, and circumstance.

FIG. 6B illustrates by way of comparison against FIG. 6A that in some embodiments the apparatus 100 may include a longitudinal channel 201 thereby undulating the body base 103. However, both FIGS. 6A and 6B show an embodiment whereby the spindles 108 are in a symmetrically splayed configuration 602. This means that the spindles 108 are level with, and evenly distributed around the edge of the end opening 104. In this embodiment the spindles 108 are also of the same length.

Figure 6C:
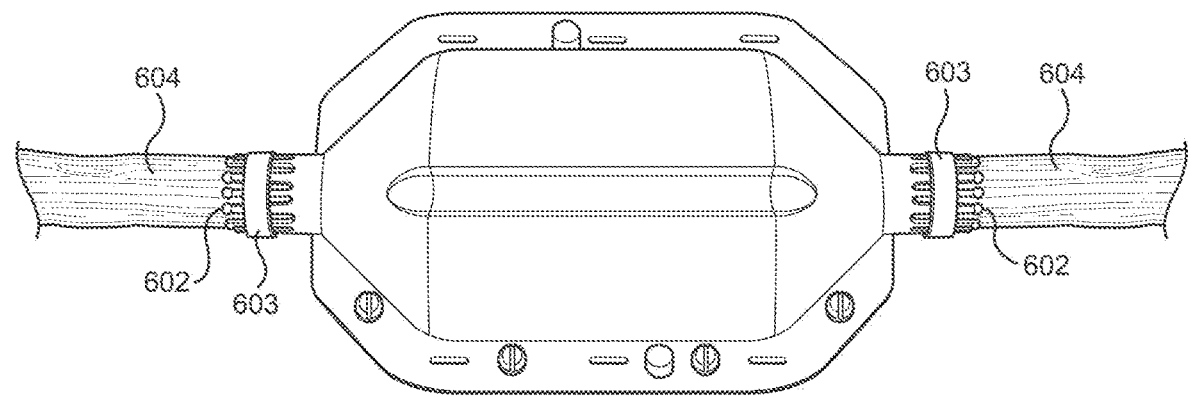
FIG. 6C is a top perspective view of the tree rooting enclosure apparatus with accessory components according to an embodiment of the invention.

FIG. 6C illustrates how the apparatus 100 may be secured when in a closed position around a tree branch 604 with symmetrically splayed spindles 602. As shown, the spindles 108 may fit around the tree branch 604 at each end opening 104, 105 and may be tightened therearound by at least one end cinch 603 at each. By tightening the end cinch 603 around the spindles 108, the apparatus 100 in turn is more firmly secured to a tree branch 604 at a desired location. However, one skilled in the art will appreciate that the end cinch 603 may or may not be used to supplement securement of the apparatus 100 depending on need, preference, and circumstance.

Figure 7A:
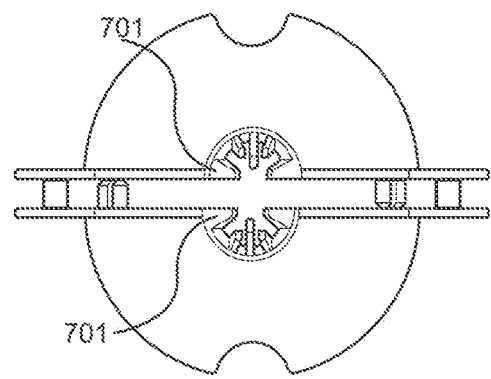
FIG. 7A is a lateral end view of the tree rooting enclosure apparatus according to another embodiment of the invention.

FIG. 7A is a lateral end view of the apparatus 100 showing an embodiment with angled spindles 701. In this embodiment, the angled spindles 701 are biased toward the center of the end openings 104, 105 creating a more fitted mount on a tree branch 604. Here, the angled spindles 701 narrow the end openings 104, 105 so that when a tree branch 606 is fitted therethrough, the angled spindles 701 are already secured thereto without the need for end cinches 603.

Figure 7B:
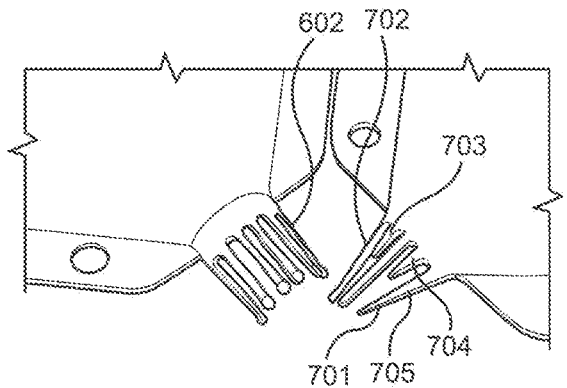
FIG. 7B is a segmented view comparing different end embodiments of the tree rooting enclosure apparatus.

FIG. 7B illustrates a comparison between the symmetrically splayed spindles 602 and the angled spindles 701. Here, the spindle angle 705 is clearly shown as biasing toward the center of the end opening 104. Furthermore, the angled spindles 701 may be staggered or alternating in their length 704. Meaning, larger spindles 702 may be alternated with smaller spindles 703. By way of non-limiting example, the larger spindles 702 may all be the same length and the smaller spindles 703 may all be the same length. Furthermore, they may all share the same biasing angle toward the center.

Figure 7C:
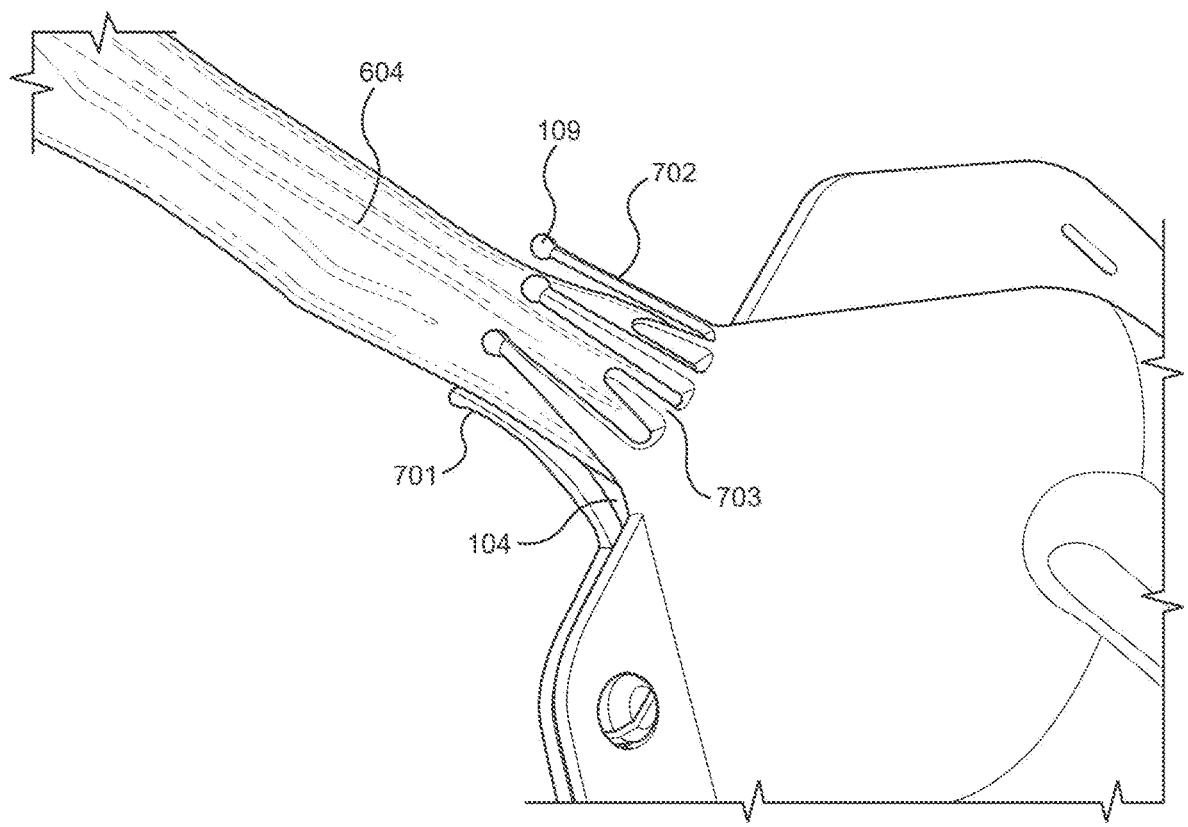
FIG. 7C is a segmented environmental perspective view of one end of the tree rooting enclosure apparatus according to an embodiment of the invention.

FIG. 7C is a segmented environmental view of a first end 104 of the apparatus 100 with angled spindles 701. As shown, the tree branch 604 is clasped by the angled spindles 701 resulting in the apparatus 100 being secured in place. By way of non-limiting example, the angled spindles 701 may be bendable and not rigid in order to create a more custom and secure fit.

Figure 8:
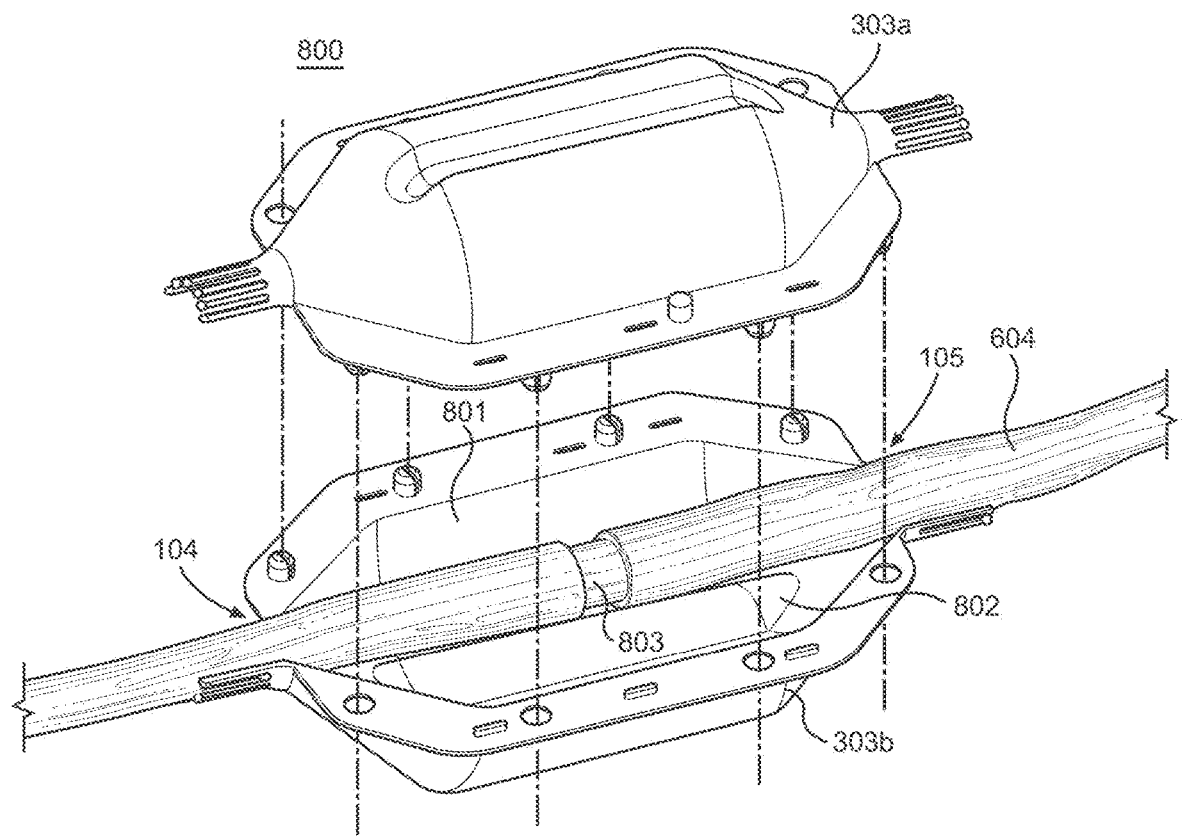
FIG. 8. is a perspective environmental view of a tree rooting enclosure apparatus in an opened position according to an embodiment of the invention.

FIG. 8 begins to illustrate some of the functional features of the apparatus 100. As shown, the apparatus 100 is in an opened position 800. A tree branch 604 with a manually created fissure 803 is positioned along a medial longitudinal axis of the apparatus 100 between the first and second enclosing members 303a, 303b.

Exposed by the open position 800 is the apparatus body internal cavity 801 created by the cylindrical body base 103 and the body tapers 106 that house the tree branch 604. Also shown is an interior longitudinal convex ridge 802 formed by the longitudinal channel 201 on the exterior of the apparatus 100. Hence, each longitudinal channel 201 of the plurality of longitudinal channels 201 includes a correlating interior longitudinal convex ridge 802. As will be explained more fully hereafter, the plurality of interior longitudinal convex ridges 802 may be structured to create channel indentions within a root network mass formed within the internal cavity 801 of the apparatus 100.

Figure 9:
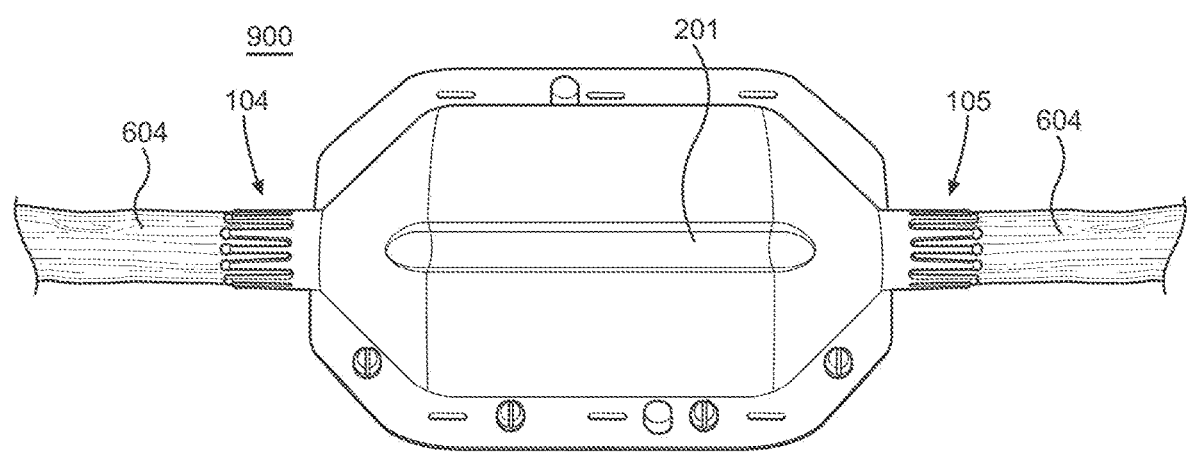
FIG. 9 is a top perspective environmental view of a tree rooting enclosure apparatus in a closed position according to an embodiment of the invention.

FIG. 9 illustrates the apparatus 100 in a closed position 900 with a tree branch 604 positioned along the medial longitudinal axis of the apparatus 100 between the first and second enclosing members 303a, 303b within the internal cavity 801. The tree branch 604 is protruding through the first and second end openings 104, 105 while the apparatus 100 is secured shut by the plurality of joinder pegs 115 engaging the plurality of joinder holes 301. Therefore, the first half enclosing member 303a and second half enclosing member 303b are shown as being structured to removably engage each other around a portion of a plant in a closed position 900 to form the whole apparatus 100.

Figure 10:
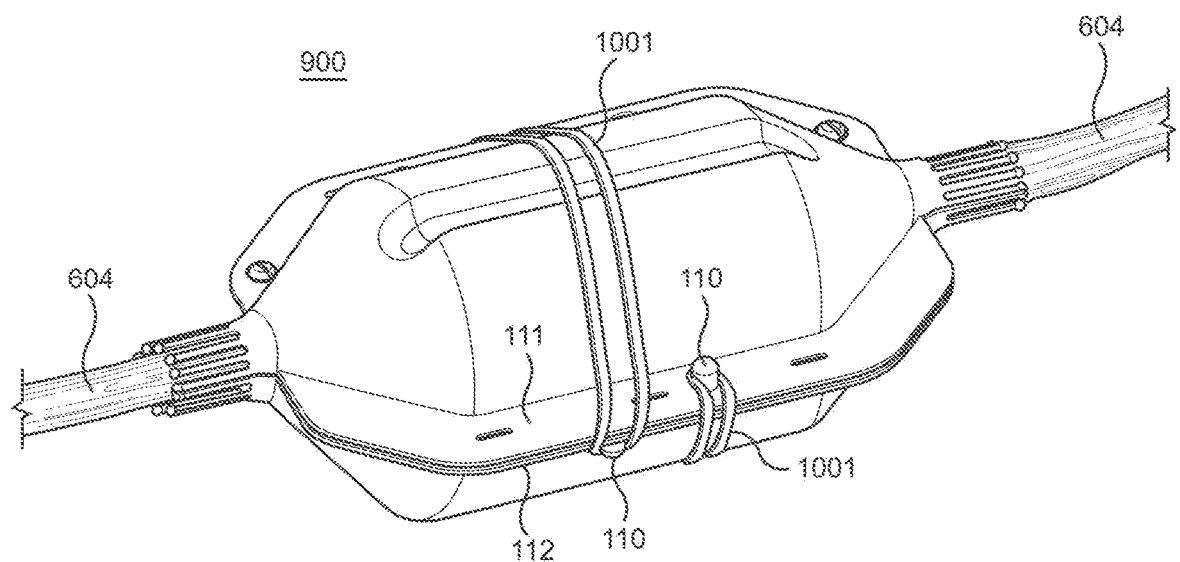
FIG. 10 is a side perspective environmental view of the tree rooting enclosure apparatus with accessory components according to an embodiment of the invention.
Figure 11:
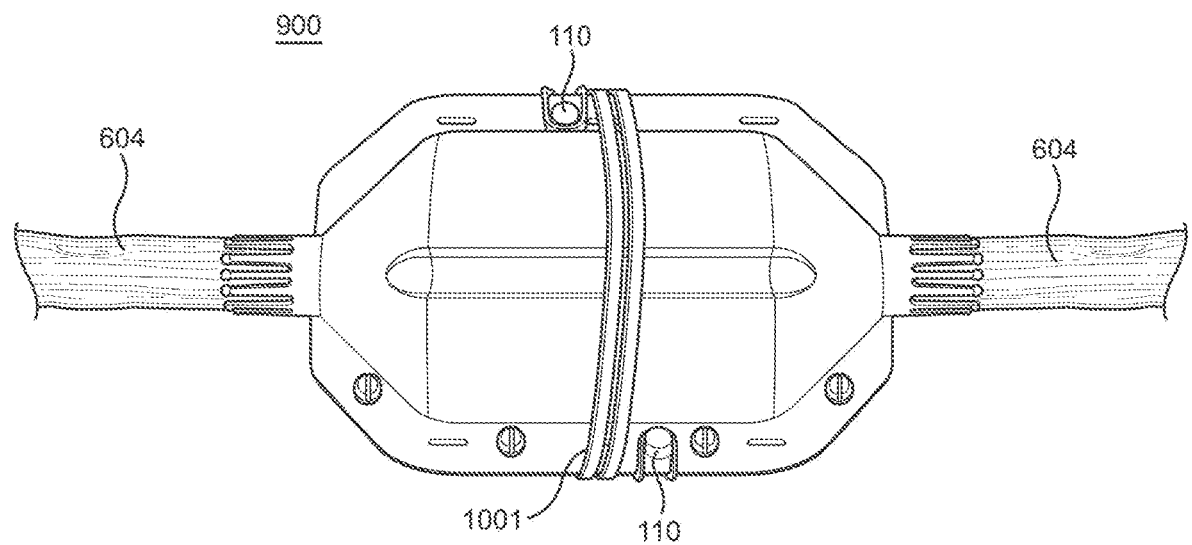
FIG. 11 is a top perspective environmental view of the tree rooting enclosure apparatus with accessory components according to an embodiment of the invention.

FIGS. 10 and 11 illustrate how the apparatus 100 may further be secured around a tree branch 604 utilizing the fastening dowels 110. As shown, when in the closed position 900 a perimeter fastening strap 1001, which by way of non-limiting example may be a rubber band, may be secured around the fastening dowel 110 extending from the right side 111 of a first enclosing member 303a, wrapped around the apparatus 100 and secured to a fastening dowel 110 positioned on an inverted second enclosing member 303b. Therefore, the perimeter fastening strap 1001 is able to be wrapped around the exterior of the apparatus 100 further securing it in the closed position 900 around a tree branch 604.

Figure 12:
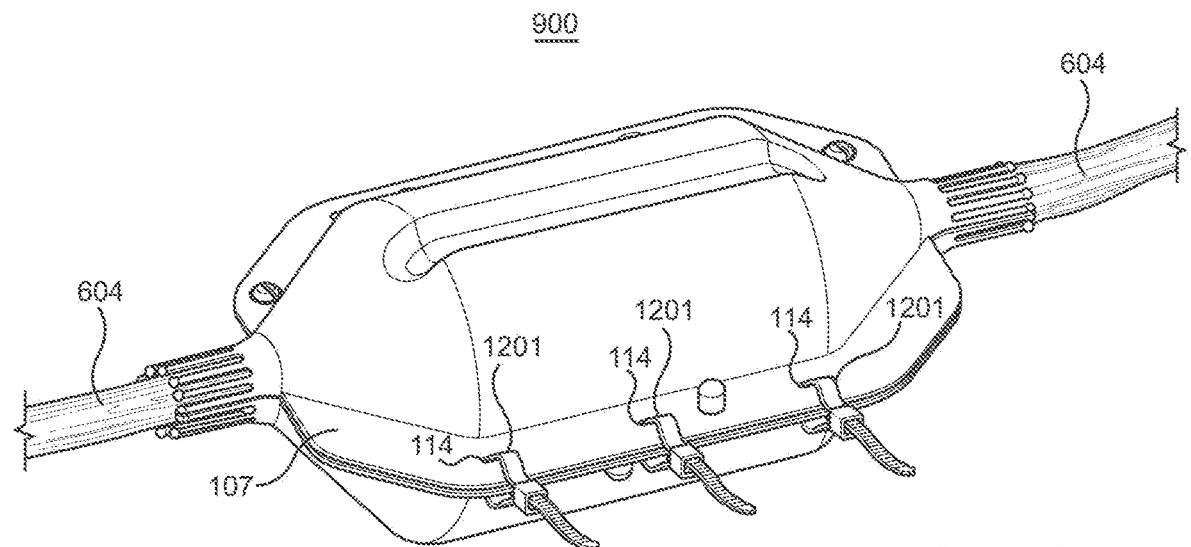
FIG. 12 is a side perspective environmental view of the tree rooting enclosure apparatus with accessory components according to an embodiment of the invention.

FIG. 12 illustrates another securing means by which the apparatus 100 may be fastened in the closed position 900 around a tree branch 604. As shown, when in the closed position 900 the fastening apertures 114 located on the perimeter tab 107 may align. This alignment may facilitate the apparatus 100 being further secured closed around a tree branch 604 when a plurality of side cinches 1201 are threaded through the aligned fastening apertures 114. In some embodiments, the side cinches 1201 may be a standard cable tie.

Figure 13:
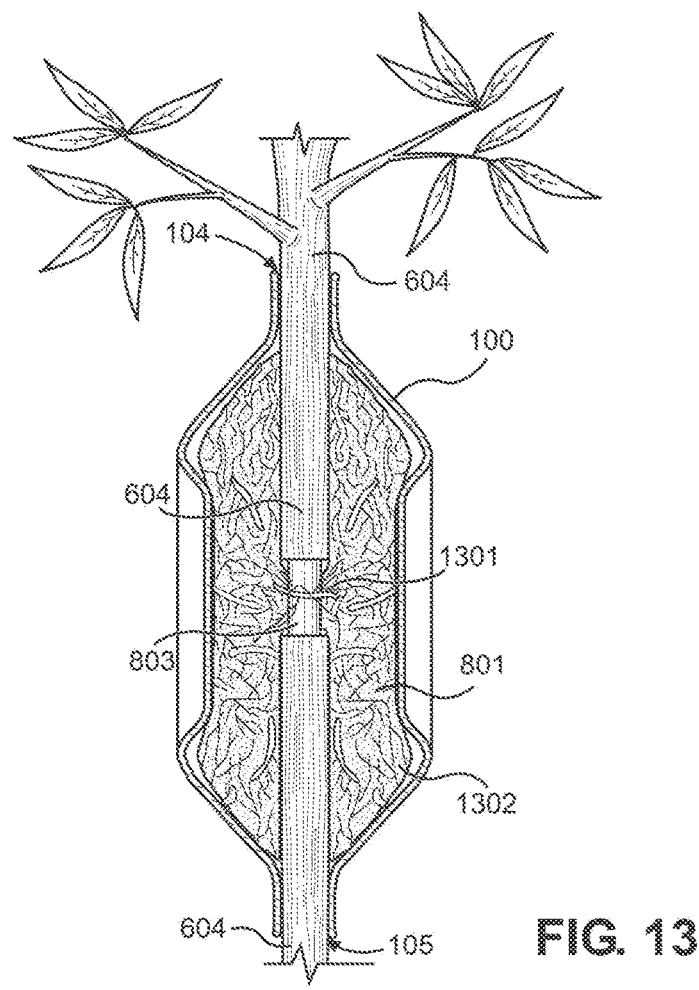
FIG. 13 is a cross sectional environmental view of the tree rooting enclosure apparatus according to an embodiment of the invention.

FIG. 13 is a cross sectional environmental view of the apparatus 100 illustrating the newly formed roots 1301 that are created within the internal cavity 801. As shown, the tree branch 604 may be enclosed within the apparatus 100 and may extend through the first and second end openings 104, 105. After the manually created fissure 803 has been created, it may be enclosed with a potting mix 1302 such as peat moss, sphagnum moss, or the like. The tree branch 604 then begins to create the newly formed roots 1301, which ultimately results in a root network mass 1401.

Figure 14A:
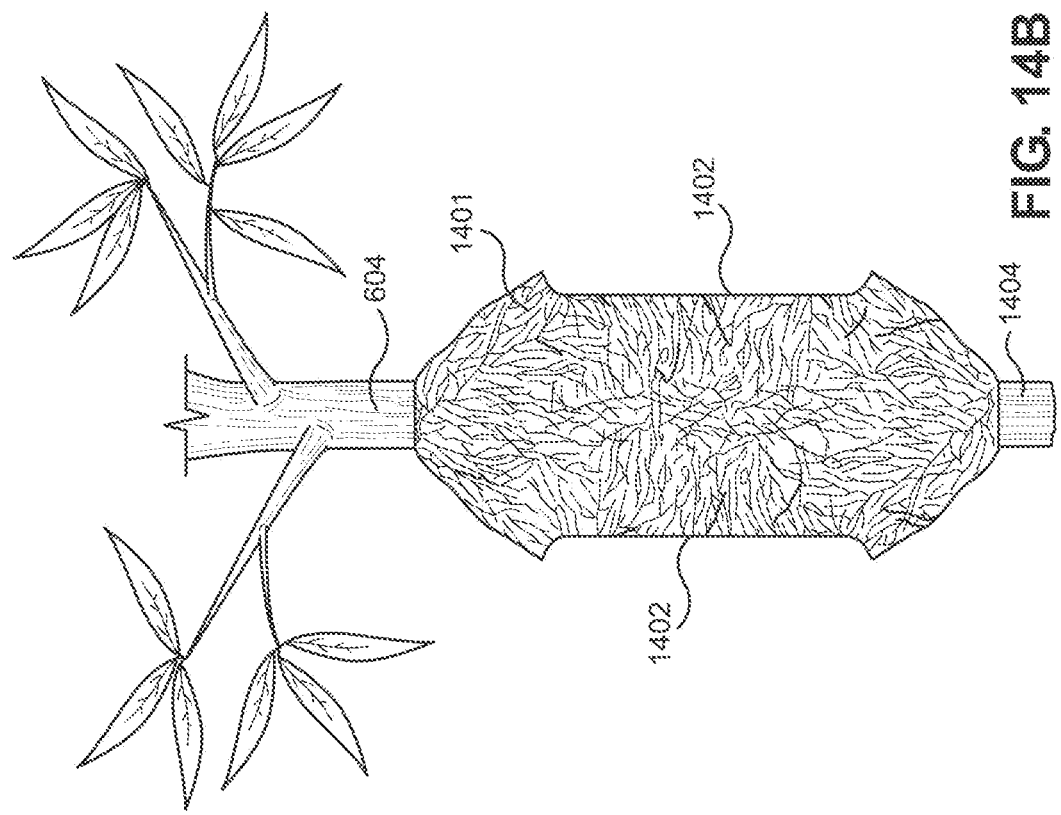
FIG. 14A is an environmental view of a root network mass created by the tree rooting enclosure apparatus according to an embodiment of the invention.
Figure 14B:
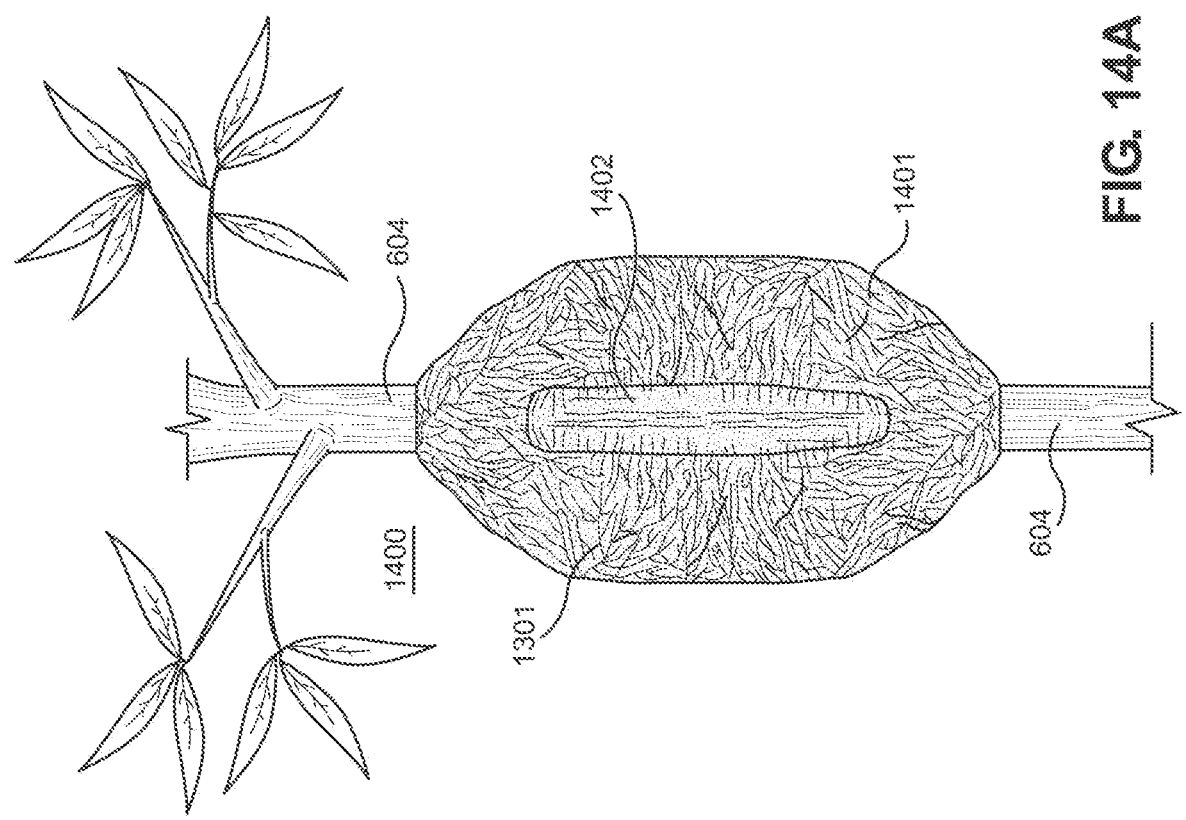
FIG. 14B is an environmental view of a root network mass created by the tree rooting enclosure apparatus according to an embodiment of the invention.

FIGS. 14A and 14B are environmental views of the root network mass 1401 created by the apparatus 100. This root network mass 1401 is formed by a combination of a mature network of newly formed roots 1301 and either a sphagnum moss or potting mix 1302 that have been compacted by the apparatus 100. This root network mass 1401 is dense enough and compacted tightly enough within the apparatus 100 to have the plurality of interior longitudinal convex ridges 802 form a plurality of longitudinal indentions 1402 within the root network mass 1401.

FIG. 14B shows that the tree branch may be severed 1404 proximate one open end 105 so that it may be planted. It also illustrates that the longitudinal indentions 1402 may be on opposing sides of the root network mass 1401.

Figure 15A:
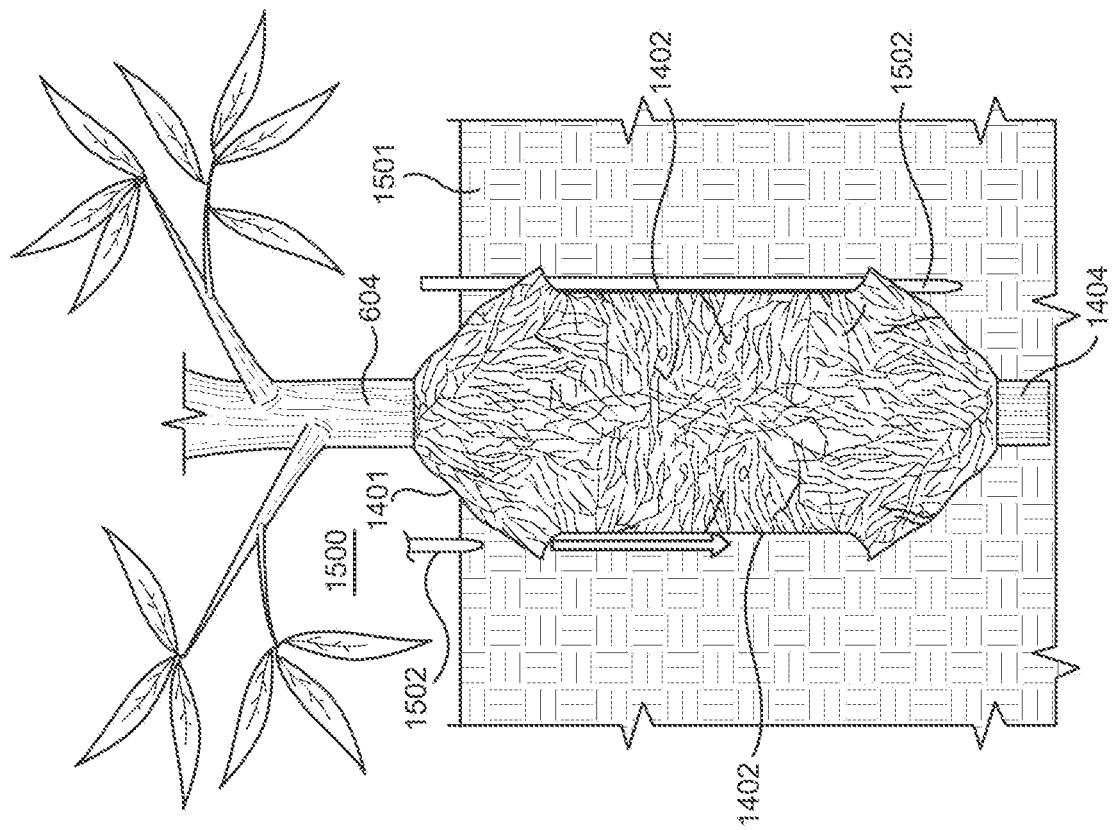
FIG. 15A is a side environmental view of a root network mass created by the tree rooting enclosure apparatus with a stabilizing stake fitted thereto.
Figure 15B:
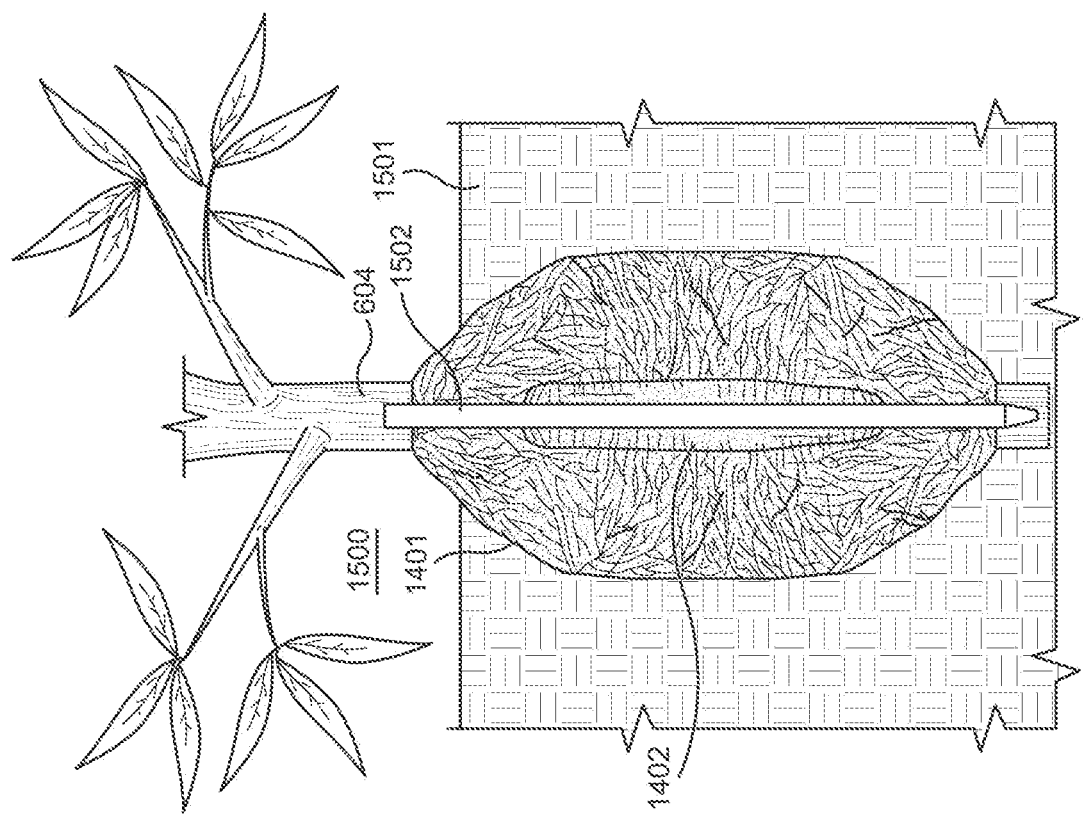
FIG. 15B is a front environmental view of a root network mass created by the tree rooting enclosure apparatus with a pair of stabilizing stakes fitted thereto.

FIGS. 15A and 15B are environmental views of the root network mass 1401 and planted branch 1500 in its own separate soil 1501. They further show that the plurality of longitudinal indentions 1402 may be used as tracks to leverage stakes 1502 aligned therewith to supply support for the root network mass 1401 and base of the planted branch 1500. This may allow for the planted branch to grow upright and mature in a healthy uniform fashion. Similar to FIG. 14B, FIG. 15B illustrates that in some embodiments two stakes 1502 may align with the longitudinal indentions 1402 on opposing sides of the root network mass 1401.

Figure 16A:
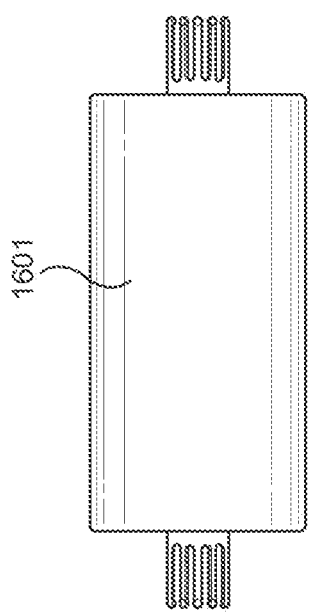
FIG. 16A illustrates a different embodiment of the tree rooting enclosure apparatus.
Figure 16B:
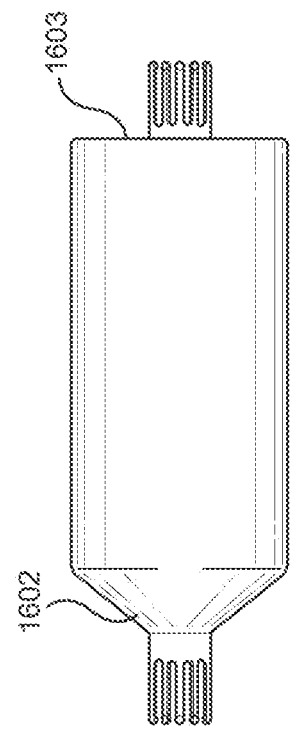
FIG. 16B illustrates a different embodiment of the tree rooting enclosure apparatus.
Figure 16C:
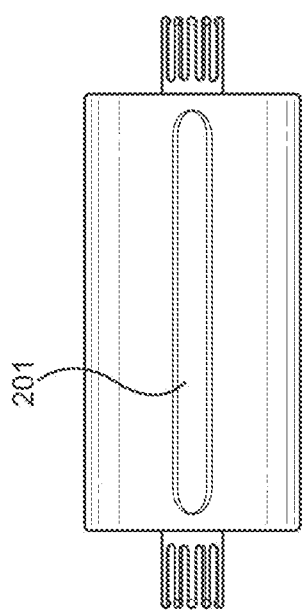
FIG. 16C illustrates a different embodiment of the tree rooting enclosure apparatus.
Figure 16D:
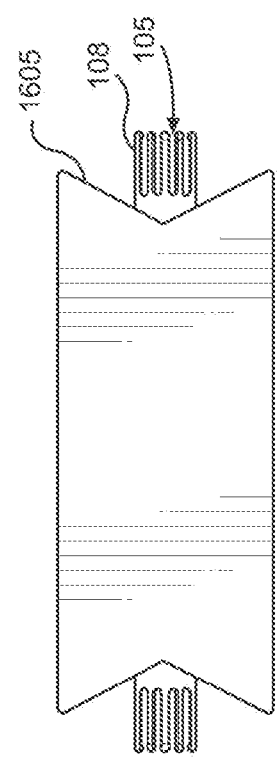
FIG. 16D illustrates a different embodiment of the tree rooting enclosure apparatus.
Figure 16E:
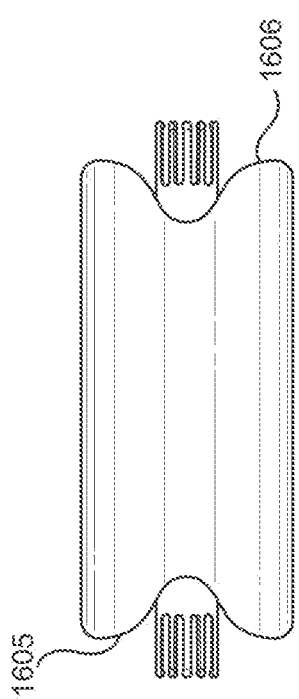
FIG. 16E illustrates a different embodiment of the tree rooting enclosure apparatus.
Figure 16F:
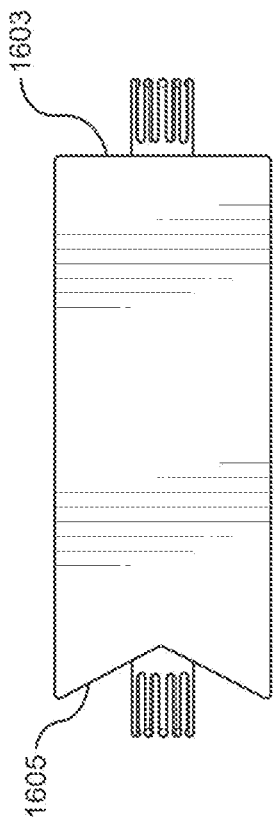
FIG. 16F illustrates a different embodiment of the tree rooting enclosure apparatus.

FIGS. 16A through 16F illustrate different embodiments of the apparatus 100 that are contemplated to be within the scope of this application. As such, FIG. 16A shows an apparatus without body tapers 106. In this embodiment, open ends 104, 105 may be medially positioned within the cylindrical body base 103. FIG. 16B illustrates that in some embodiments, an apparatus first end 101 may include a single body taper 1602 and an apparatus second end 102 may include only the truncated end 1603 of a cylindrical body base 103. FIG. 16C may be the same as the embodiment shown in FIG. 16A with the addition of at least one longitudinal channel 201 positioned thereon. FIG. 16D illustrates an embodiment whereby the cylindrical body base 103 includes inverted tapered ends 1605. In this embodiment, the open ends 104, 105 may be medially positioned between the inverted tapered ends 1602 within the cylindrical body base 103. FIG. 16E is similar to FIG. 16D, however, it includes rounded vertices at the inverted tapered ends 1605. Additionally, FIG. 16F includes an embodiment whereby one end of the cylindrical body base 103 includes inverted tapered ends 1605 and the other includes a truncated end 1603.

Figure 17:
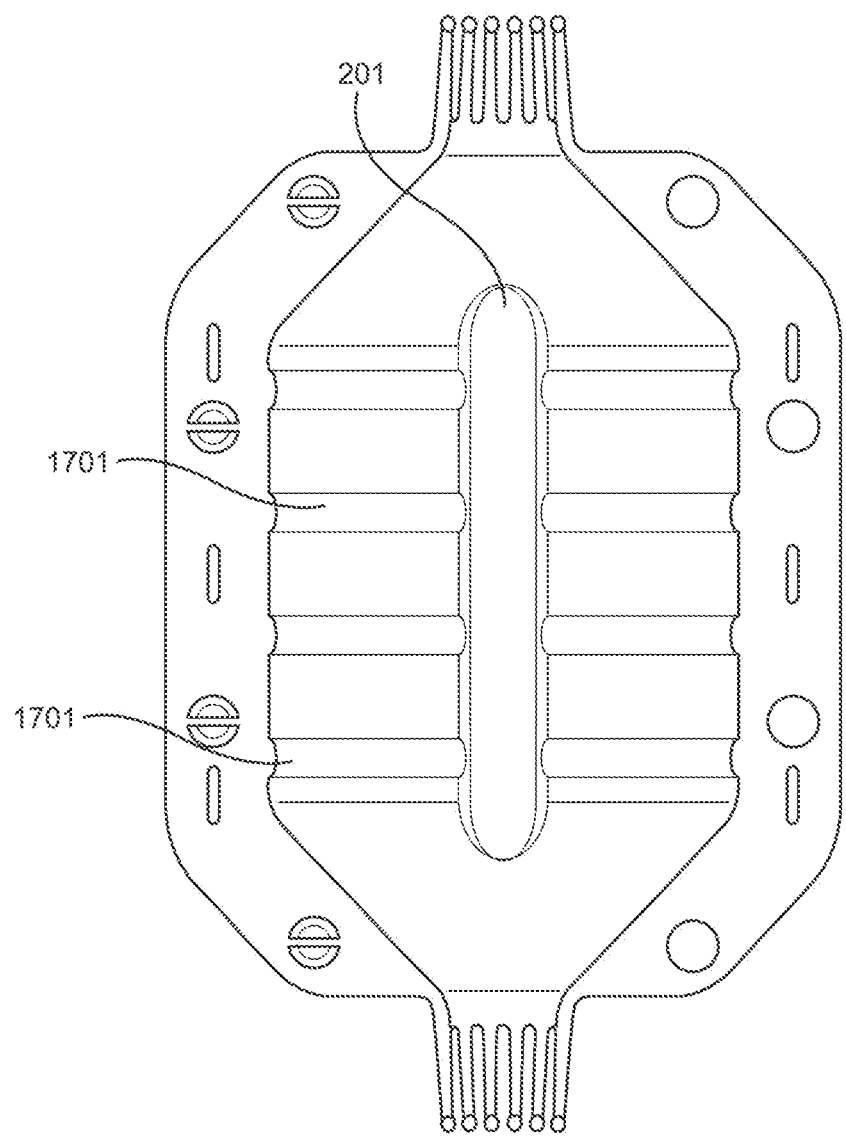
FIG. 17 illustrates another embodiment of the tree rooting enclosure apparatus.

FIG. 17 illustrates another embodiment of the invention whereby the longitudinal channel 201 is supplemented with a plurality of lateral channels 1701. The plurality of lateral channels 1701 may form a plurality of interior lateral convex ridges structured to create lateral channel indentions within a root network mass 1401 formed inside the apparatus 100. These lateral channel indentions may assist with stabilizing and leveraging the root network mass 1401 when it is planted in its own separate soil 1501. In other words, these lateral channel indentions within the root network mass 1401 may fill in with dirt when planted and may stabilize the planted branch 1500 as well as prevent it from easily being pulled out of its own separate soil 1501.

Figure 18:
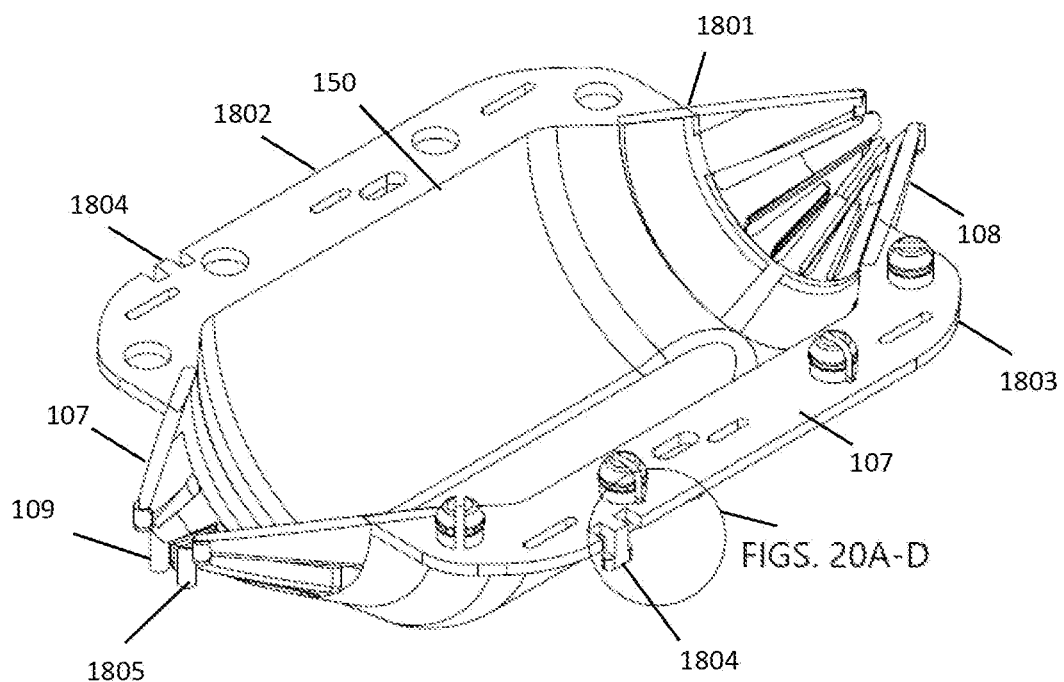
FIG. 18 is a perspective view of one half of the tree rooting enclosure apparatus according to an embodiment of the invention.
Figure 19:
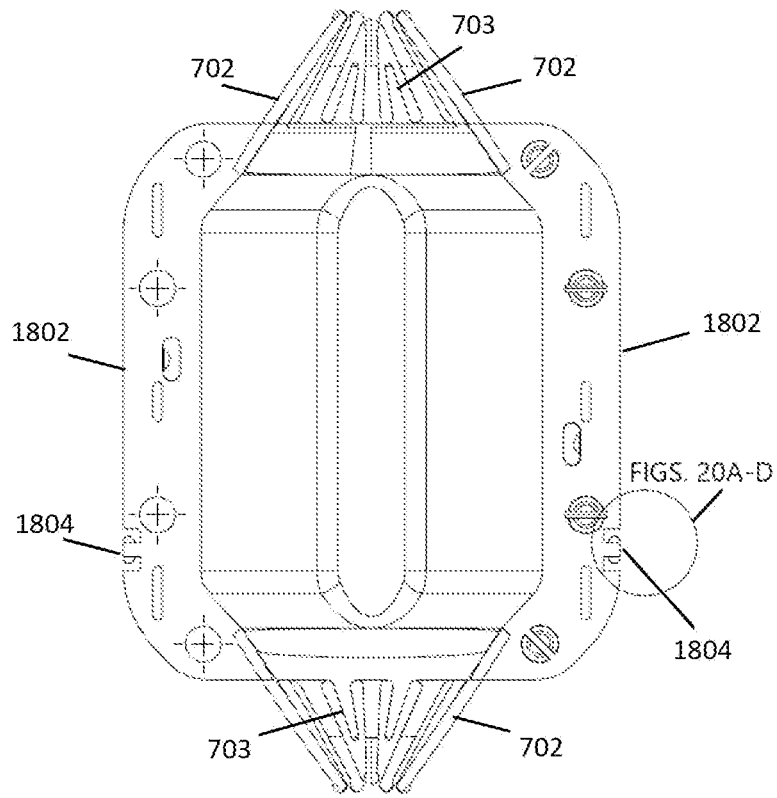
FIG. 19 is a top view of one half of the tree rooting enclosure apparatus according to the embodiment of the invention illustrated in FIG. 18.

FIGS. 18 and 19 illustrate another embodiment of the invention whereby the perimeter tab 107 may include elbow shaped T-levers 1804 structured to facilitate opening the apparatus 100 when both halves are engaged. Furthermore, this embodiment illustrates that the plurality of spindles 108 may include at least one spindle 108 shorter in length than the others 703 and at least one spindle end 109 distal to the end opening 1801 that is terminated by a cylinder 1805. The spindles may also be angled 705 and in some embodiments, the plurality of spindles 108 on each half may include at least one pair of longer spindles 702 flanking at least one shorter medial spindle 703.

Additionally, the perimeter tab 107 may include four rounded corners 1803 and a pair of parallel sides 1802. Each side 1802 of each half may be completely surrounded or bordered by the perimeter tab 107. At each longitudinal end 1801 of each half of the apparatus 100, the perimeter tab 107 may converge into the end opening 1801. In other words, the opposing end openings may form a concave void in the perimeter tab 107 at each respective end of the apparatus 100. Furthermore, in some embodiments, the width of the body 150 compared to the end opening 1801 may equal 1 to 0.75 respectively. In some embodiments, the plurality of spindles 108 may include five (5) spindles 108 per half, per end. In other embodiments, the plurality of spindles 108 may include two (2) spindles 108 per half, per end. However, one skilled in the art will appreciate that the number of spindles 108 may be more or less depending on need, preference, and circumstance.

FIGS. 20A through 20D show the elbow shaped T-levers 1804 in more detail. As shown, they may include a pair of opposing T-flanks 2001 on either side of a drop member 2004. The drop member 2004 may be perpendicular to an extender 2003 that protrudes from the perimeter tab 107 forming the elbow 2002.

FIGS. 21 and 22 illustrates another embodiment of the invention whereby the perimeter tab 107 includes a finger tab 2101 structured to facilitate a user opening the apparatus 100 when both halves are engaged. The finger tab 2101 may extend outward from the perimeter tab 107 and may include a u-shaped member designed to fit a standard user's finger within the u-shaped void.

FIGS. 23A through 23D illustrate the finger tab 2101 in more detail. As shown, the finger tab 2101 may include a pair of extending arms 2302 connected by a concave pull 2301. The extending arms 2302 may cause the finger tab 2101 to extend distally from the perimeter tab 107 and the concave pull 2301 may be sized and dimensioned to allow the concave finger tab protrusion 2101 to facilitate a user's finger fitting into the created concave void. The concave pull 2301 may be used by a user to leverage and pull the perimeter tab 107 and apparatus half away from its engaged other half.

FIG. 24 illustrates another embodiment of the invention whereby opposing sides 1801 of the perimeter tab 107 may include a pair of fastening hooks 2401 structured to facilitate securing the apparatus 100 in a closed position with a perimeter fastening strap. The fastening hooks 2401 may abut an aperture 2403 within the perimeter tab 107. This figure also emphasizes that in some embodiments there may be as few as two spindles 2402. It also highlights that the spindle ends 109 may be terminated by cylinders 1805.

FIGS. 25A through 25C emphasize the fastening hooks 2401 in more detail. As shown, they may be positioned on the perimeter tab 107 and may include a hook housing 2501, a hook hood 2502, and a hook void 2503 within the hook housing. The hook hood 2502 may allow for a fastening strap to remain in place without prolapsing or slipping off entirely.

That which is claimed is:

1. A tree rooting enclosure apparatus comprising:
a body comprising:
a cylindrical body base,
a pair of opposing end openings with edges exterior to the body; and
a plurality of spindles longitudinally oriented with respect to the cylindrical body base and extending outward from the exterior edges of the pair of opposing end openings;
wherein the tree rooting enclosure apparatus is comprised of two removably engageable halves, each half being an identical duplicate of the other;
wherein each half is configured to mate with the other half when each respective half is inversely oriented with respect to the other half; and
wherein both halves when engaged envelop at least a portion of a tree branch to propagate a rooting system.

2. The tree rooting enclosure apparatus of claim 1 wherein the plurality of spindles comprises at least one spindle shorter in length than the remaining spindles.

3. The tree rooting enclosure apparatus of claim 1 wherein the spindles are configured in at least one of a symmetrically splayed orientation and an angled orientation.

4. The tree rooting enclosure apparatus of claim 1 wherein the cylindrical body base diameter is proportional to the end opening diameters by a ratio of 1 to 0.75 respectively.

5. The tree rooting enclosure apparatus of claim 1 wherein the cylindrical body base comprises a perimeter tab extending distally therefrom.

6. The tree rooting enclosure apparatus of claim 5 wherein the perimeter tab comprises an elbow shaped T-lever configured to facilitate opening the tree rooting enclosure apparatus when both halves are engaged.

7. The tree rooting enclosure apparatus of claim 5 wherein the perimeter tab comprises four rounded corners and a pair of parallel sides.

8. The tree rooting enclosure apparatus of claim 5 wherein the pair of opposing end openings form a concave void in the perimeter tab at each respective end of the tree rooting enclosure apparatus.

9. A tree rooting enclosure apparatus comprising:
a body comprising:
a cylindrical body base,
a perimeter tab extending from the cylindrical body base, and
a pair of opposing end openings with edges exterior to the body;
a plurality of spindles longitudinally oriented with respect to the cylindrical body base and extending outward from the exterior edges of the pair of opposing end openings; and
a plurality of longitudinal channels extending the length of the cylindrical body base;
wherein the tree rooting enclosure apparatus is comprised of two removably engageable halves, each half being an identical duplicate of the other;
wherein each half is configured to mate with the other half when each respective half is inversely oriented with respect to the other half; and
wherein both halves when engaged envelop at least a portion of a tree branch to propagate a rooting system.

10. The tree rooting enclosure apparatus of claim 9 wherein the plurality of spindles comprises at least one pair of longer spindles flanking at least one shorter medial spindle.

11. The tree rooting enclosure apparatus of claim 9 wherein opposing sides of the perimeter tab comprise a pair of fastening hooks configured to facilitate securing the tree rooting enclosure apparatus in a closed position with a perimeter fastening strap.

12. The tree rooting enclosure apparatus of claim 9 wherein at least one of the plurality of spindles comprises an end distal to its respective end opening that is terminated by a cylinder.

13. The tree rooting enclosure apparatus of claim 9 wherein the perimeter tab of each half includes a concave protrusion configured to facilitate a user pulling apart the two halves when the two halves are engaged.

14. The tree rooting enclosure apparatus of claim 13 wherein the concave protrusion is dimensioned to allow a user's finger to fit into its concave void.

15. The tree rooting enclosure apparatus of claim 9 wherein the perimeter tab comprises a plurality of fastening apertures configured to accommodate a plurality of side cinches for securing the tree rooting enclosure apparatus in a closed position.

16. The tree rooting enclosure apparatus of claim 9 wherein the perimeter tab comprises at least one side with a plurality of joinder pegs and an opposing side with a plurality of joinder holes.

17. The tree rooting enclosure apparatus of claim 16 wherein the plurality of joinder pegs of the first half enclosing member is configured to removably engage the plurality of joinder holes of the second half enclosing member to form a water-resistant fitting when the apparatus is in a closed position.

18. The tree rooting enclosure apparatus of claim 9 wherein the spindles are in an angled orientation.

19. The tree rooting enclosure apparatus of claim 9 wherein the plurality of spindles includes at least one spindle shorter in length than the others and at least one spindle comprises an end distal to its respective end opening that is terminated by a cylinder.

20. A tree rooting enclosure apparatus comprising:
a body comprising:
a cylindrical body base,
a perimeter tab extending the entire longitudinal length of two sides of the cylindrical body base comprising at least one of a concave finger tab extension and an elbow shaped T-lever,
a pair of opposing end openings with edges exterior to the body;
a plurality of spindles longitudinally oriented with respect to the cylindrical body base and extending outward from the exterior edges of the pair of opposing end openings;
wherein the tree rooting enclosure apparatus is comprised of two removably engageable halves, each half being an identical duplicate of the other;
wherein each half is configured to mate with the other half when each respective half is inversely oriented with respect to the other half;
wherein both halves when engaged envelop at least a portion of a tree branch to propagate a rooting system; and
wherein the concave finger tab protrusion and elbow shaped T-lever are configured to facilitate a user pulling apart the two halves when the two halves are engaged.

* * * * *